United States Patent
Shah et al.

(10) Patent No.: US 10,866,755 B2
(45) Date of Patent: Dec. 15, 2020

(54) TWO STAGE COMMAND BUFFERS TO OVERLAP IOMMU MAP AND SECOND TIER MEMORY READS

(71) Applicant: Google LLC, Mountain View, CA (US)

(72) Inventors: Monish Shah, Dublin, CA (US); Benjamin Charles Serebrin, Sunnyvale, CA (US); Albert Borchers, Aptos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/373,207

(22) Filed: Apr. 2, 2019

(65) Prior Publication Data

US 2019/0227729 A1   Jul. 25, 2019

Related U.S. Application Data

(62) Division of application No. 15/267,404, filed on Sep. 16, 2016, now Pat. No. 10,296,256.

(Continued)

(51) Int. Cl.
*G06F 3/06* (2006.01)
*G06F 12/08* (2016.01)
(Continued)

(52) U.S. Cl.
CPC .......... *G06F 3/0647* (2013.01); *G06F 3/0611* (2013.01); *G06F 3/0656* (2013.01); *G06F 3/0685* (2013.01); *G06F 12/08* (2013.01); *G06F 12/1081* (2013.01); *G06F 12/0868* (2013.01); *G06F 13/28* (2013.01); *G06F 2212/1024* (2013.01); *G06F 2212/312* (2013.01)

(58) Field of Classification Search
CPC .. G06F 12/08; G06F 12/0868; G06F 12/1081; G06F 13/28; G06F 2212/1024; G06F 2212/312; G06F 3/0611; G06F 3/0647; G06F 3/0656; G06F 3/0685
See application file for complete search history.

(56) References Cited

U.S. PATENT DOCUMENTS 7,509,471 B2   3/2009   Gorobets
7,818,525 B1   10/2010  Frost et al.
(Continued)

FOREIGN PATENT DOCUMENTS

JP   2004139503 A    5/2004
TW      244587 B    12/2005

OTHER PUBLICATIONS

Extended European Search Report for European Patent Application No. 17179008.2 dated Dec. 13, 2017. 11 pages.
(Continued)

*Primary Examiner* — Yong J Choe
(74) *Attorney, Agent, or Firm* — Lerner, David, Littenberg, Krumholz & Mentlik, LLP

(57) ABSTRACT

IOMMU map-in may be overlapped with second tier memory access, such that the two operations are at least partially performed at the same time. For example, when a second tier memory read into a storage device controller internal buffer is initiated, an IOMMU mapping may be built simultaneously. To achieve this overlap, a two-stage command buffer is used. In a first stage, content is read from a second tier memory address into the storage device controller internal buffer. In a second stage, the internal buffer is written into the DRAM physical address.

15 Claims, 5 Drawing Sheets

Related U.S. Application Data

(60) Provisional application No. 62/362,353, filed on Jul. 14, 2016.

(51) Int. Cl.
*G06F 12/1081* (2016.01)
*G06F 12/0868* (2016.01)
*G06F 13/28* (2006.01)

(56) References Cited

U.S. PATENT DOCUMENTS

| | | |
|---|---|---|
| 2005/0080986 A1 | 4/2005 | Park |
| 2008/0114906 A1 | 5/2008 | Hummel et al. |
| 2010/0017556 A1 | 1/2010 | Chin et al. |
| 2012/0272037 A1 | 10/2012 | Bayer et al. |
| 2015/0169238 A1 | 6/2015 | Lee et al. |
| 2016/0019138 A1 | 1/2016 | Lee |
| 2016/0162316 A1 | 6/2016 | King |

OTHER PUBLICATIONS

Office Action dated Mar. 22, 2018, for Taiwanese Patent Application No. 106121714.
English Translation of Office Action dated Mar. 22, 2018, for Taiwanese Patent Application No. 106121714. 5 pages.

400

TWO STAGE COMMAND BUFFERS TO OVERLAP IOMMU MAP AND SECOND TIER MEMORY READS

CROSS-REFERENCE TO RELATED APPLICATIONS

The present application is a divisional of U.S. patent application Ser. No. 15/267,404, filed Sep. 16, 2016 which claims the benefit of the filing date of U.S. Provisional Patent Application No. 62/362,353 filed Jul. 14, 2016, the disclosures of which are hereby incorporated herein by reference.

BACKGROUND

Modern computer systems often contain storage devices that utilize memory such as flash memory to store data. Other memory technologies, such as Spin-Transfer Torque Magnetic Random Access Memory (STT-MRAM), phase-change memory (PCM) and resistive memory (ReRAM) can also be used in place of flash memory. All of these have the characteristic that they are slower than DRAM, which is used as the primary working memory of the computer system. These other memories supplement the DRAM in some fashion and will be called "second tier memories" herein. In some cases, the data from the second tier memory must be brought into DRAM before it is operated upon.

When data from a second tier memory device is to be written to host dynamic random access memory (DRAM), it must have write-access to the host DRAM pages. In a system with an input/output memory management unit (IOMMU) enforcing the principle of least privilege, the IOMMU management can add critical latency to the process of fetching data from second tier memory and copying to DRAM. For example, where pages are only writeable by the second tier memory device for a minimum duration needed by the second tier memory device, there are no long-lasting mappings to all of physical memory. Accordingly, the mappings must be performed for each write operation, which creates delay.

One type of storage device controller is an application specific integrated circuit (ASIC) that uses low-latency non-volatile NAND storage (LLNAND) flash that serves as a swap device, among other functions. Infrequently accessed DRAM pages are evicted by the operating system (OS) and put into the storage device controller. On a user mode page fault to an evicted page, the OS page fault handler determines where the swap-in data comes from. When the storage device controller is the handler for a page fault, it must fetch a page from its flash device and copy it into host CPUs DRAM at a specified address.

The storage device controller may have a number of command buffers that can service simultaneous outstanding requests, and then do a completion writeback to a specified address. For example, some storage device controllers have 128 command buffers. Copying from the storage device controller into CPU DRAM requires either that the storage device controller have full access to CPU DRAM, or that IOMMU mappings be dynamically created as needed. IOMMU mapping creation may be a performance burden.

Typically, writing data from a second tier memory, such as a flash memory, to a DRAM requires an OS page fault handler to determine that a backing storage is at the storage device controller flash address (FA), allocate a free, zero-filled 4 KB page at DRAM physical address (PA), map PA into the IOMMU, and send a command to the storage device controller containing {FA, PA, completion data}. Then the storage device controller copies bytes from flash at FA into an internal buffer. This can take a relatively long time, such as 1 us-100 μs. Next, the storage device controller copies bytes from an internal buffer to system DRAM PA, and sends a completion notification. Then, the OS unmaps PA and resumes the user code. This serial process results in significant latency.

BRIEF SUMMARY

IOMMU map-in may be overlapped with second tier memory access, such that the two operations are at least partially performed at the same time. For example, when a second tier memory read into a storage device controller internal buffer is initiated, an IOMMU mapping may be built simultaneously. To achieve this overlap, a two-stage command buffer is used. In a first stage, content is read from a second tier memory address into the storage device controller internal buffer. In a second stage, the internal buffer is written into the DRAM physical address.

One aspect of the disclosure provides a method, comprising copying, in a first stage using one or more processors, data from a given second tier memory address into an internal buffer of a storage controller, the copying at least partially occurring during mapping by an operating system of a specified physical address into an input/output memory management unit (IOMMU). The method further includes determining, with the one or more processors, whether a second stage is triggered, and if the second stage is triggered, copying, with the one or more processors, the data from the internal buffer of the storage controller to the specified physical address of dynamic random access memory (DRAM).

Another aspect of the disclosure provides another method, comprising identifying a particular second tier memory address storing data, allocating a page at a particular physical address of dynamic random access memory (DRAM), and sending a command to a storage controller, the command identifying the particular second tier memory address and initiating a first stage in which the stored data is read from the particular second tier memory address into a buffer of the storage controller. The method further includes mapping the particular physical address into an input/output memory management unit (IOMMU), the mapping at least partially occurring during the first stage reading, and editing the command to the storage controller to initiate a second stage in which the stored data is written from the storage controller buffer to the particular DRAM physical address.

Yet another aspect of the disclosure provides a storage controller, comprising a memory including a buffer and one or more processors in communication with the memory. The storage controller may be further coupled to a second tier memory. The one or more processors are configured to copy, in a first stage, data from a given second tier memory address of the second tier memory into the buffer of the storage controller, the copying at least partially occurring during mapping by an operating system of a specified physical address into an input/output memory management unit (IOMMU). The one or more processors are further configured to determine whether a second stage is triggered, and if the second stage is triggered, copy the data from the buffer of the storage controller to the specified physical address of dynamic random access memory (DRAM).

DETAILED DESCRIPTION

Overview

Figure 1:
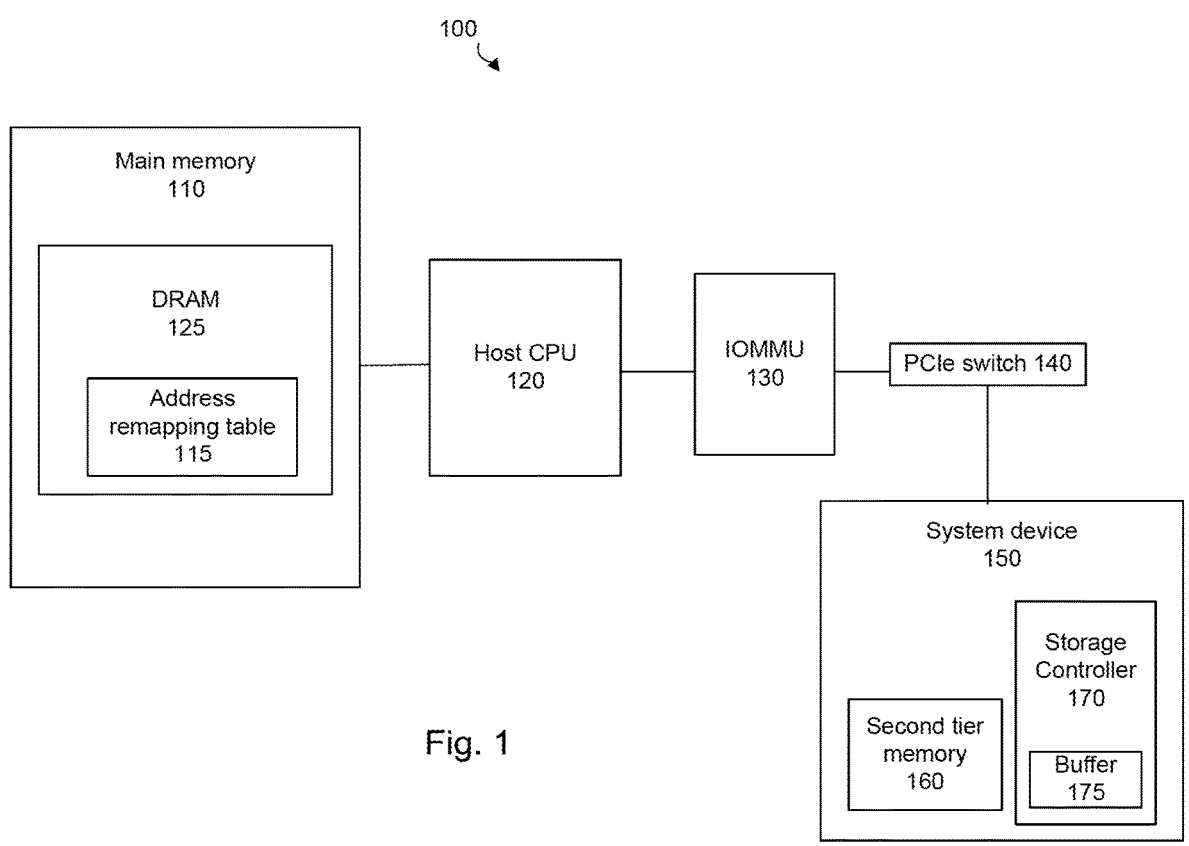
FIG. 1 is a block diagram of an example system according to aspects of the disclosure.

The technology relates generally to optimizing second tier memory device access, by overlapping IOMMU map-in with second tier memory access. When initiating a second tier memory read into a storage device controller internal buffer, an IOMMU mapping is simultaneously built. This can be accomplished using a two-stage command buffer. In a first stage, contents from a second tier memory address are read into the storage device controller internal buffer. In the second stage, the internal buffer is written into a DRAM physical address.

According to some examples, the operations of the second stage may be triggered by one or more events. For example, an operating system may send a new command or update a previous command sent to the storage controller. A single bit may be added to a command tuple from the OS page fault handler. For example, the tuple with trigger may be: {FA, PA, completion data, Stage 2 Start}, where FA is the second tier memory address, PA is the physical address, and Stage 2 Start is a flag which indicates whether to perform a conventional read or a two-stage read, and/or whether the second stage of the two-stage read should be initiated. In this example, to perform a conventional second tier memory read, the command tuple may be written with the additional bit Stage 2 Start=1. On the other hand, to perform a second tier memory read with 2-stage behavior, the additional bit may be set to Stage 2 Start=0 in an initial command, and then to Stage 2 Start=1 to trigger the second stage operations. Setting Start to 1 may be done with a byte-sized peripheral component interconnect express (PCIe) write. If the start bit is on a byte by itself, the CPU can start stage 2 by a simple 1-byte write to the appropriate PCIe address.

According to this example of using a two-stage buffer, the OS sends a command to the storage device controller containing {FA, PA, completion data, Stage 2 Start=0}. The OS further maps PA into the IOMMU, and edits the command to set Stage 2 Start=1. It is expected that the PA mapping in the IOMMU will complete faster than the storage device controllers fetch of second tier memory data, as second tier memory reads are relatively slow and the storage device controller may have several outstanding transactions. Each individual CPU may have only a single page fault pending, so it has no work other than IOMMU mapping to perform.

The Stage 2 Start control serves to avoid writing by the storage device controller before the IOMMU mapping is created, which would be a critical error. Because CPU to PCIe writes are posted uncacheable, the additional write in editing the command to set Stage 2 Start=1 should only add latency that is overlapped by the second tier memory access latency.

In some examples, storage device controllers may have full access to host memory, while in other examples they may have only ephemeral access using the IOMMU. In either case, the mappings of the storage device controller PCIe address to CPU DRAM address is desired to be simple. Accordingly, an arbitrary constant may be added to every address used, so that numerical consistency is not required. For example, a single BASE_OFFSET is added, and all of CPU memory in PCIe IOMMU space is mapped into a contiguous region of input/output virtual addresses (IOVAs). For example, the IOMMU is used to map CPU memory starting at PCIe address 1 TB. Device drivers of the storage device controller converts DRAM physical addresses into PCIe addresses by adding a 1 TB offset.

Further to the example above, all of memory can be mapped, but the IOMMU can still enforce permissions. By default a system device has no permission to access host memory within the base-address offset range. When an input/output (IO) happens, the host sends commands to the IOMMU to allow the system device to access an appropriate page in the base-address offset range. The system device completes the IO. The host then commands the IOMMU to drop the permissions. In this regard, the mapping itself is set up once at initialization time, and only the permissions need to be changed at IO time.

Example Systems

FIG. 1 illustrates an example system 100 for overlapping second tier memory reads with IOMMU mapping. The system 100 may be, for example, a system of computing devices interconnected on a motherboard. Such a system may be present in datacenters or other computing environments, such as on personal computing devices, laptops, mobile phones, video game systems, local area networks, wide area networks, etc. The system 100 includes main memory 110 coupled to a central processing unit (CPU) 120. The CPU 120 is further coupled to an input/output memory management unit (IOMMU) 130. The IOMMU 130 and one or more system devices 150 are connected via a peripheral interconnect card express (PCIe) switch 140.

The main memory 110 is accessible by the CPU 120, and may store data and instructions executable by the CPU 120. The main memory 110 may be any type of memory, such as read only memory, random access memory, removable storage media, cache, registers, or the like. The main memory 110 may include DRAM 125 and address remapping table 115, and other data and memory units.

The CPU 120 is connected to and communicates with the main memory 110 by, for example, a data bus and an address bus. The CPU 120 may be a microprocessor residing on a chip, or any other known processor. While only a single CPU 120 is shown, any number of CPUs may be connected between the main memory 110 and the IOMMU 130. For example, the CPU 120 may be a multi-core processor.

The IOMMU 130 connects DMA-capable devices to the main memory 110. The IOMMU 130 further maps device addresses to physical addresses in the address remapping table 115.

The PCIe switch 140 is a high speed interconnect providing for interconnection of one or more system devices 150 to other components in the system 100. The PCIe switch 140 may be a motherboard-level interconnect, an expansion card interface, or the like. The system devices may communicate through the PCIe switch 140 over one or more links. While the PCIe switch 140 is present in the example of FIG. 1, it should be understood that other example systems may omit the PCIe switch.

The system device 150 may be any type of device capable of communicating over the system 100. By way of example only, the system device 150 may be a network interface controller (NIC) or a graphics processing unit (GPU). Although only one system device 150 is shown, the system 100 may include any number of system devices.

As shown, the system device 150 includes second tier memory 160. The second tier memory 160 may be, for example, a flash device, such as a memory card, a USB drive, a solid-state drive, or any other type of memory device. In other examples, the second tier memory 160 may be STT-MRAM, ReRAM, PCM, or any other type of second tier memory. The second tier memory 160 may be fixed in the system device 150, or it may be removable.

The system device 150 further includes storage controller 170. The storage controller 170, described in further detail in connection with FIG. 2, further includes internal buffer 175.

Reads and writes from the second tier memory 160 involve many of the other components of the system 100. For example, according to the present disclosure, an operating system (OS) of the host CPU 120 identifies that storage data is stored at a particular second tier memory address of the second tier memory 160. The OS allocates a page at a particular dynamic random access memory (DRAM) physical address. The OS then sends a command to the storage controller 170 to initiate a first stage, wherein the data is read from the particular flash address into the internal buffer 175 of the storage controller 170. At the same time as the reading from the flash memory, the OS maps the particular physical address into the IOMMU 130, for example, using the address remapping table 115. When reading of the flash memory address is complete, the OS edits the command to the storage control 170 to initiate a second stage, in which the data is written from the internal buffer 175 to the particular physical address of the DRAM 125.

While the system 100 has been described above as a system of devices on a motherboard, it should be understood that the system 100 may be any configuration of electronically coupled computing devices. For example, the system may include a backplane interconnecting peripherals, an expansion card interface, or the like. As another example, the connection between the computing devices may be hard-wired connections, wireless connections, or any other type of connections. As yet another example, the system 100 may include TCP/IP, 802.11, Ethernet, InfiniB and, or any other type of network.

While the storage controller 170 may have full access to host memory 120, in some cases it may have only ephemeral access using the IOMMU 130. For example, all of memory can be mapped, but the IOMMU 130 can still enforce permissions. By default the system device 150 has no permission to access host memory within the base-address offset range. When an input/output (IO) happens, the host 120 sends commands to the IOMMU 130 to allow the system device 150 to access an appropriate page in the base-address offset range. The system device 150 completes the IO, and the host 120 then commands the IOMMU 130 to drop the permissions. In this regard, the mapping itself is set up once at initialization time, and only the permissions need to be changed at IO time.

Whether the storage controller 170 has full access to host memory 120 or ephemeral access, mappings of the storage controller's PCIe address to the CPU DRAM address may be kept consistent, despite use of a different mapping mechanism. For example, a single base_offset may be added to the relevant mechanism. Accordingly, all of CPU memory in PCIe IOMMU space may be mapped into a contiguous region of input/output virtual addresses (IOVAs).

Figure 2:
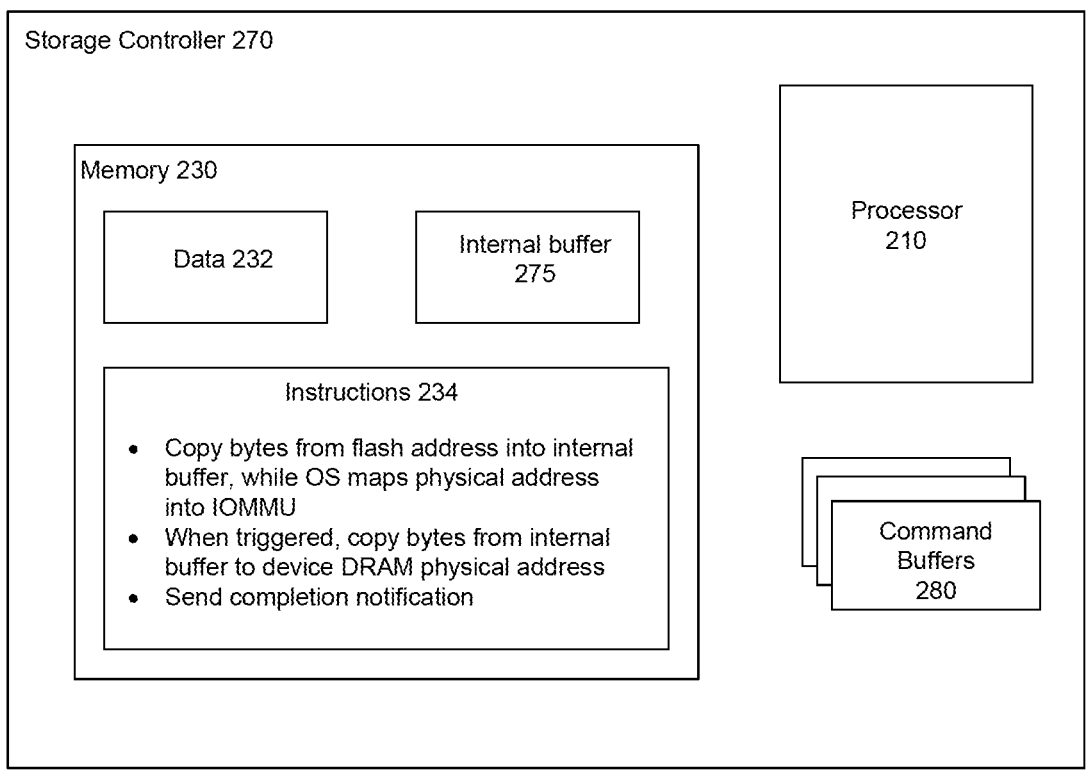
FIG. 2 is a block diagram of an example storage controller according to aspects of the disclosure.

FIG. 2 depicts an example storage controller 270. As illustrated, the storage controller 270 may include a processor 210, a memory 230, and command buffers 280. The processor 210 may be any well-known processor, such as a commercially available CPU or microcontroller. Alternatively, the processor may be a dedicated controller such as an ASIC. According to another example, the processor may be a state machine.

Memory 230 stores information accessible by processor 210, including instructions 234 that may be executed by the processor 210. The memory also includes data 232 that may be retrieved, manipulated or stored by the processor. The memory may be of any type capable of storing information accessible by the processor, such as write-capable and read-only memories. The memory 230 includes data 232 that may be retrieved, manipulated or stored by the processor in accordance with the instructions 234. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 234 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 234 may be executed by the processor, for example, to perform an efficient flash memory read/write. For example, the instructions 234 may provide for copying bytes from a specified flash address into the internal buffer 275 while the OS maps a designated physical address into the IOMMU. The instructions 234 may further provide for determining whether a second stage is triggered, for example, by a command from the OS or by another event. Such commands from the OS may be written into the command buffers 280. When the second stage is triggered, the storage controller 270 copies bytes from the internal buffer 275 to the designated physical address in the DRAM. The storage controller 270 may send a notification to the OS when this is complete.

Although FIG. 2 functionally illustrates the processor 210 and memory 230 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 120. Similarly, the processor 120 may actually comprise a collection of processors which may or may not operate in parallel.

Figure 3:
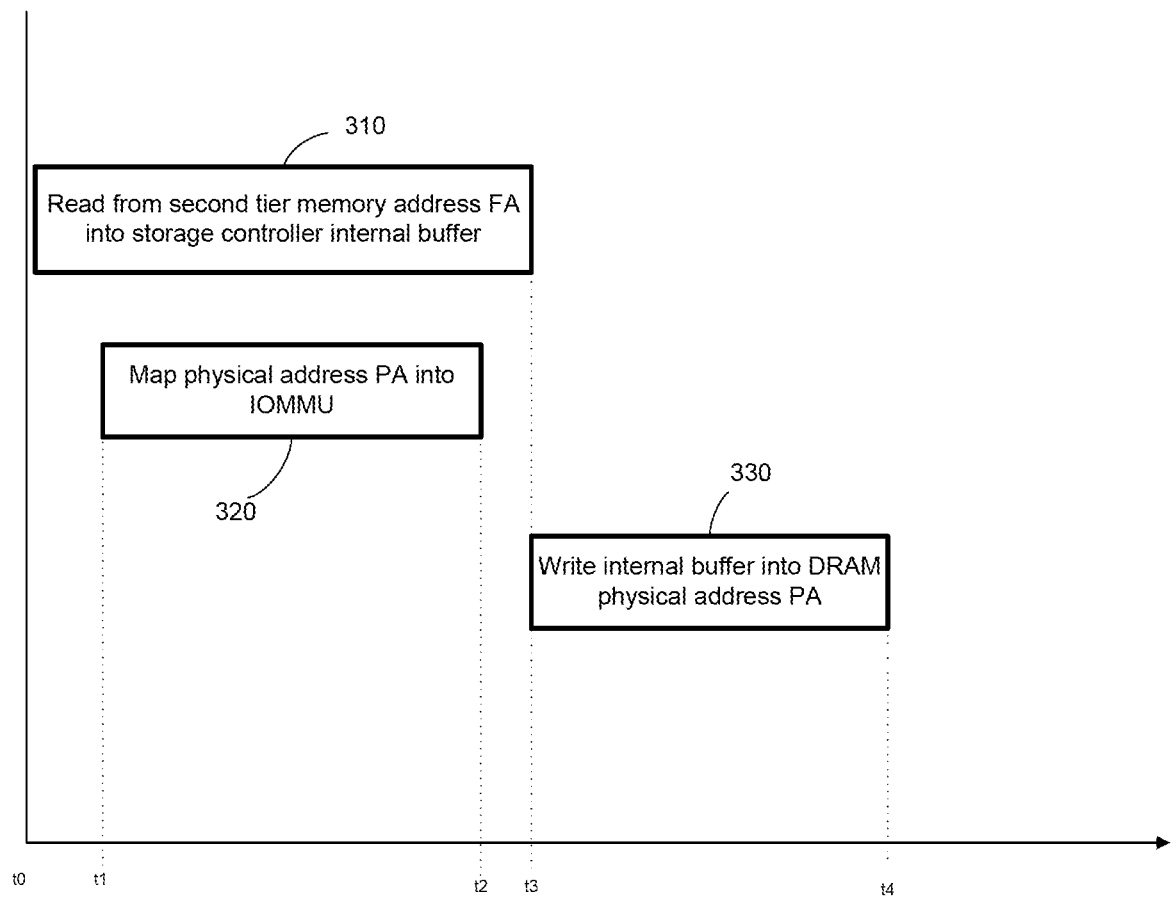
FIG. 3 is an example timing diagram according to aspects of the disclosure.

FIG. 3 is an example timing diagram, illustrating the relative timing of the flash reads, IOMMU mapping, and writing to DRAM. As shown, operation 310 of reading from a given flash address FA into the storage controller's internal buffer is relatively long. For example, this operation may take up to 1 μs-100 μs, or more or less. As shown in FIG. 3, the read operation starts at time t0 and ends at time t3.

In the interim, operation 320 is performed, in which a given physical address PA is mapped into the IOMMU. This operation may also be somewhat lengthy. However, a total time for all operations 310-330 is reduced by performing IOMMU mapping operation 320 simultaneously with flash read operation 310, as opposed to sequentially. While IOMMU mapping operation 320 is shown as beginning at a time t1 and ending at a time t2, these times may be varied relative to the times t0 and t3. For example, the IOMMU mapping operation 320 may begin prior to the flash read operation 310. Alternatively or additionally, the IOMMU mapping operation 310 may end after the flash read operation 310 is complete. In this regard, the IOMMU mapping operation 320 may only partially overlap with the flash read operation 310. However, this overlap may still result in significant reduction in latency.

When the IOMMU mapping operation 320 is complete, operation 330 may be triggered, where the internal buffer is written into the given physical address of the DRAM. While this operation 330 is shown as commencing almost instantaneously when the operation 310 ends, there may be a slight buffer period between the two operations. In other examples, the write operation 330 may begin before the read operation 310 is complete, but after the IOMMU mapping operation 320 is complete.

Example Methods

Further to the example systems described above, example methods are now described. Such methods may be performed using the systems described above, modifications thereof, or any of a variety of systems having different configurations. It should be understood that the operations involved in the above methods need not be performed in the precise order described. Rather, various operations may be handled in a different order or simultaneously, and operations may be added or omitted.

Figure 4:
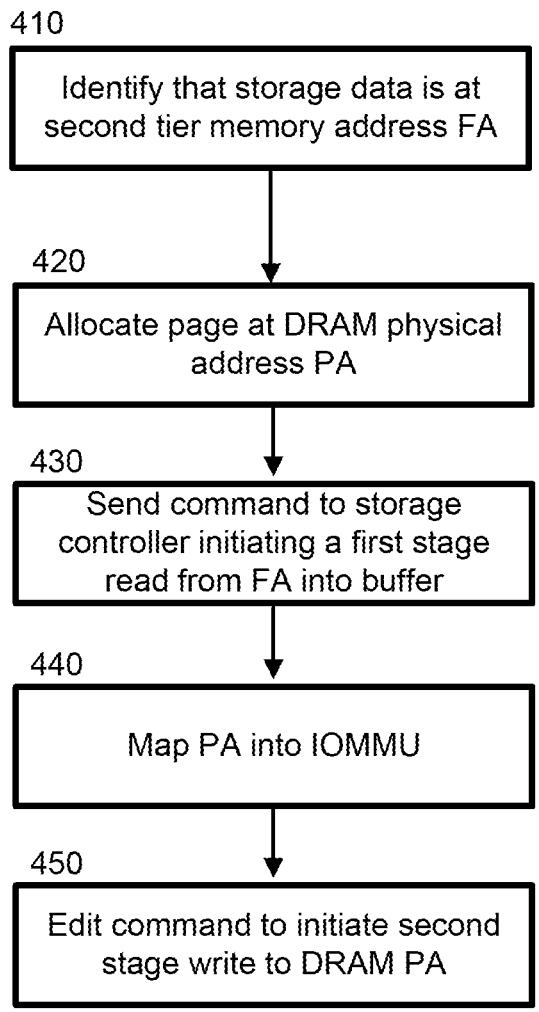
FIG. 4 is a flow diagram illustrating an example method according to aspects of the disclosure.

FIG. 4 provides an example flow diagram illustrating a method 400. This method 400 may be performed by, for example, the OS of the host CPU 120 (FIG. 1).

In block 410, it is determined that storage data is stored at a particular flash address FA. By way of example only, a user may input a command to access data in a particular file stored in a flash memory device. Accordingly, an OS page fault handler may identify the flash address corresponding to that file.

In block 420, pages are allocated at a particular DRAM physical address PA.

In block 430, an initial command is sent to the storage controller. Such command initiates reading from the particular flash address FA into an internal buffer of the storage controller. The command may be, for example, a tuple identifying the flash address, physical address, and completion data. The command may further indicate that two-stage processing for the read should be performed, where IOMMU mapping is overlapped with flash reads. The indication may be, for example, a bit added to the command tuple, wherein the bit is set to 0 to initiate a first stage and is set to 1 to initiate a second stage. For example, such a tuple may be: {FA, PA, completion data, 2nd Stage Start}. Such tuple may also be used to indicate that conventional, one-stage serial processing should be performed. For example, in an initial command, the 2nd Stage Start bit may be set to 1, as opposed to 0. In other examples, the indication may be a separate command. For example, an operating system may send a new command to the storage controller.

In some cases, the physical address PA may not be known until IOMMU mapping (block 440) is complete. For example, after IOMMU mapping the physical address PA may actually be a virtual address, such as an input/output virtual address (IOVA). In these cases, the initial first stage command may write only the flash address FA and completion data to the storage controller, e.g., {FA, completion data}. The updated second stage command may indicate the physical address PA and the bit to initiate start of the second stage, e.g., {PA, 2nd Stage Start=1}. Such updated second stage command may be, for example, a single 8 byte write, where the physical address occupies bits 63-1, and the stage 2 start indication occupies the last bit 0.

In block 440, the particular DRAM physical address PA is mapped into the IOMMU. This mapping is performed at least partially during a time period in which the first stage read from flash address FA into the buffer is performed. In some examples, the IOMMU mapping may be completed before the flash read is complete. In other examples, IOMMU mapping may continue for some time after the flash read is complete. In such examples, writing of the internal buffer to DRAM physical address will be delayed until the IOMMU mapping is complete.

In block 450, the initial command is edited to initiate a second stage, in which the data is written from the internal buffer to the DRAM physical address PA. For example, referring back to the example of using the tuple for the initial command, the 2nd Stage Start bit may be changed from 0 to 1. This change may indicate to the storage controller that the IOMMU mapping is complete, and that the storage controller may therefore commence writing without causing an error.

Figure 5:
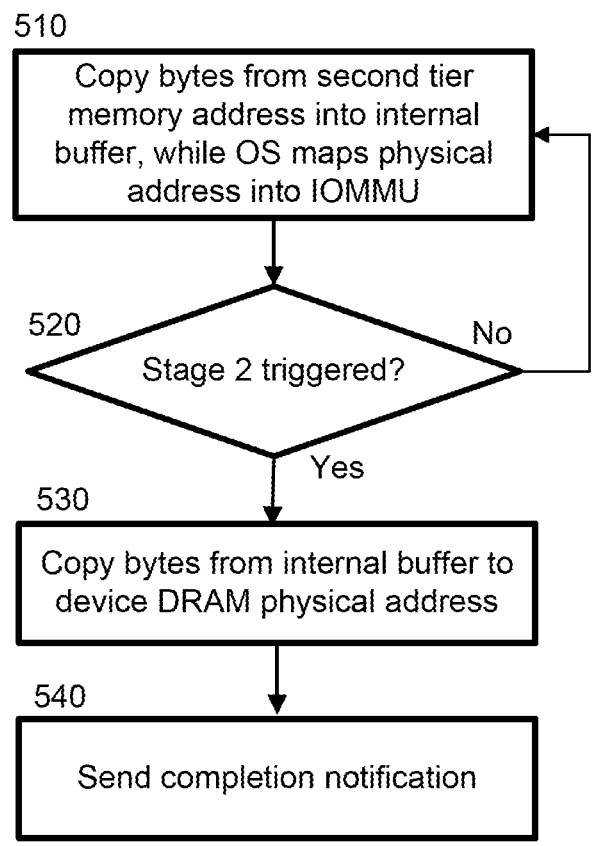
FIG. 5 is a flow diagram illustrating another example method according to aspects of the disclosure.

FIG. 5 provides another example flow illustrating a method 500. This method 500 may be performed by, for example, the storage controller. Some of the operations in the method 500 correspond to operations of the OS in the method 400 described above, such as by being responsive to commands from the OS.

In block 510, bytes of data are copied from the particular flash address FA into an internal buffer. This may be performed while the OS maps the physical address PA into the IOMMU (block 440, FIG. 4).

In block 520, it is determined whether a triggering event has occurred that would trigger initiation of the second stage. One example of a triggering event is receiving a notification, such as a particular bit set in a command tuple, from the OS that IOMMU mapping is complete. Other examples of triggering events include writing of the physical address PA by the OS, a timeout of a predetermined length, etc. It should be understood that these triggers are merely examples, and any number of other types of triggers are possible.

If the second stage has not been triggered, the method 500 may return to block 510 and continue reading from flash into the internal buffer. In other examples, if the second stage has not been triggered, the storage controller may sit and wait for the trigger. However, if it is determined that stage 2 has been triggered, the method proceeds to block 530. Here, the bytes of data copied to the internal buffer are further copied to the particular physical address of the DRAM.

In block 540, a notification is sent indicating that the flash read/write is complete. For example, the notification may be sent to the OS or to another system device, such as the system device 150 (FIG. 1).

The foregoing systems and methods may improve computing performance by, for example, reducing latency associated with flash reads/writes. By overlapping the IOMMU mapping with the initial flash read, significant time is saved without hindering processing performance.

While a number of examples have been described above, it should be understood that such examples are not limiting and that further modifications may be made. For example, while the methods described above are described in connection with a storage device controller, it should be understood that such methods may be implemented in firmware. Further, the two-stage processing is not limited to flash, but may also be used for graphics processing units (GPUs), general purpose GPUs (GPGPUs), neural net accelerators copying to CPU memory, or other accelerators moving data to host memory.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method, comprising:
   identifying a particular second tier memory address storing data;
   allocating a page at a particular physical address of dynamic random access memory (DRAM);
   sending a command to a storage controller, the command identifying the particular second tier memory address and the particular physical address and initiating a first stage in which the stored data is read from the particular second tier memory address into a buffer of the storage controller;
   mapping the particular physical address into an input/output memory management unit (IOMMU), the mapping at least partially occurring during the first stage reading; and
   editing the command to the storage controller to initiate a second stage in which the stored data is written from the storage controller buffer to the particular DRAM physical address.

2. The method of claim 1, wherein the mapping is completed prior to completion of the first stage.

3. The method of claim 1, wherein the command comprises a tuple having a bit designated for identifying at least one of an initiation of the first stage or an initiation of the second stage.

4. The method of claim 1, wherein sending the command to the storage controller further comprises identifying the particular physical address.

5. The method of claim 1, wherein editing the command to the storage controller comprises identifying the particular physical address, the particular physical address being a virtual address after the mapping into the IOMMU.

6. A system, comprising:
   one or more memories; and
   one or more processors in communication with the one or more memories, the one or more processors configured to:
      identify a particular second tier memory address storing data;
      allocate a page at a particular physical address of dynamic random access memory (DRAM);
      send a command to a storage controller, the command identifying the particular second tier memory address and the particular physical address and initiating a first stage in which the stored data is read from the particular second tier memory address into a buffer of the storage controller;
      map the particular physical address into an input/output memory management unit (IOMMU), the mapping at least partially occurring during the first stage reading; and
      edit the command to the storage controller to initiate a second stage in which the stored data is written from the storage controller buffer to the particular DRAM physical address.

7. The system of claim 6, wherein the one or more processor are configured to complete the mapping prior to completion of the first stage.

8. The system of claim 6, wherein the command comprises a tuple having a bit designated for identifying at least one of an initiation of the first stage or an initiation of the second stage.

9. The system of claim 6, wherein in sending the command to the storage controller the one or more processors are further configured to identify the particular physical address.

10. The system of claim 6, wherein in editing the command to the storage controller the one or more processors are further configured to identify the particular physical address, the particular physical address being a virtual address after the mapping into the IOMMU.

11. A non-transitory computer-readable medium storing instructions executable by one or more processors to perform a method, comprising:
   identifying a particular second tier memory address storing data;
   allocating a page at a particular physical address of dynamic random access memory (DRAM);
   sending a command to a storage controller, the command identifying the particular second tier memory address and the particular physical address and initiating a first stage in which the stored data is read from the particular second tier memory address into a buffer of the storage controller;
   mapping the particular physical address into an input/output memory management unit (IOMMU), the mapping at least partially occurring during the first stage reading; and
   editing the command to the storage controller to initiate a second stage in which the stored data is written from the storage controller buffer to the particular DRAM physical address.

12. The computer-readable medium of claim 11, wherein the mapping is completed prior to completion of the first stage.

13. The computer-readable medium of claim 11, wherein the command comprises a tuple having a bit designated for identifying at least one of an initiation of the first stage or an initiation of the second stage.

14. The computer-readable medium of claim 11, wherein sending the command to the storage controller further comprises identifying the particular physical address.

15. The computer-readable medium of claim 11, wherein editing the command to the storage controller comprises identifying the particular physical address, the particular physical address being a virtual address after the mapping into the IOMMU.

* * * * *